(12) United States Patent
Wixey et al.

(10) Patent No.: US 6,262,839 B1
(45) Date of Patent: *Jul. 17, 2001

(54) OPTICAL UNIT FOR IMAGE PROJECTION AND TOOL INCORPORATING SAME

(75) Inventors: Barry D. Wixey, Finksburg; Robert P. Welsh, Hunt Valley, both of MD (US)

(73) Assignee: Black & Decker Inc., Newar, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,792

(22) Filed: Oct. 5, 2000

Related U.S. Application Data

(60) Continuation of application No. 09/070,277, filed on Apr. 30, 1998, now Pat. No. 6,141,147, which is a division of application No. 08/693,730, filed on Aug. 7, 1996, now Pat. No. 5,795,113.

(51) Int. Cl.[7] .............................. G02B 5/04; B23C 1/12; B24B 49/00; B26D 7/27
(52) U.S. Cl. .......................... 359/438; 359/831; 359/833; 359/436; 409/210; 409/214; 409/218; 83/522.15; 83/522.19; 144/114.1; 144/117.1; 144/116; 408/16; 408/116; 33/488; 451/9
(58) Field of Search .................................. 359/436, 438, 359/831, 833, 834; 144/114.1, 117.1, 116, 131, 134.1, 136.1; 409/218, 210, 214; 408/16, 116; 451/6, 9; 83/522.15–522.19, 522.21; 33/488

(56) References Cited

U.S. PATENT DOCUMENTS

| 1,671,272 | * | 5/1928 | Buckingham . | |
|---|---|---|---|---|
| 2,547,731 | * | 4/1951 | Bailey . | |
| 2,873,776 | * | 2/1959 | Buttke . | |
| 3,712,262 | * | 1/1973 | Kisselmann et al. . | |
| 4,417,834 | * | 11/1983 | Jagers . | |
| 5,795,113 | * | 8/1998 | Wixey et al. | 359/438 |
| 6,141,147 | * | 10/2000 | Wixey et al. | 359/438 |

FOREIGN PATENT DOCUMENTS

| 856178 | * | 12/1960 | (GB) . |
|---|---|---|---|
| 0610684 | * | 6/1978 | (SU) . |

* cited by examiner

Primary Examiner—Ricky D. Shafer
(74) Attorney, Agent, or Firm—Harness, Dickey & Pierce, P.L.C.

(57) ABSTRACT

An optical unit for projecting an image including first and second locating lines for substantially eliminating the introduction of visual parallax error. In one preferred form, the optical unit is incorporated into a machine for performing a forming operation on a workpiece and is operative to project an image of a portion of a scale to a position easily read by the user during machine operation. The optical unit includes a prism portion having a first side disposed adjacent the scale, a second side at an angle to the first side for reflecting the image and a third side through which the projected image may be viewed. The first locating line is disposed on the first side and the second locating line is disposed on the third side such that visual alignment eliminates the introduction of visual parallax error associated with reading a scale.

19 Claims, 3 Drawing Sheets

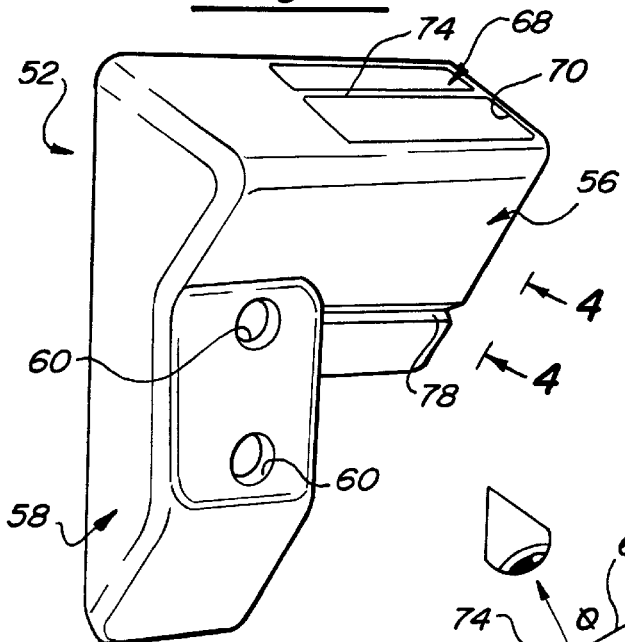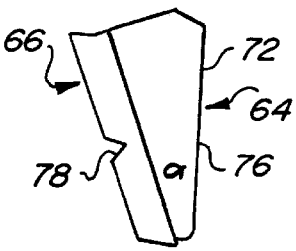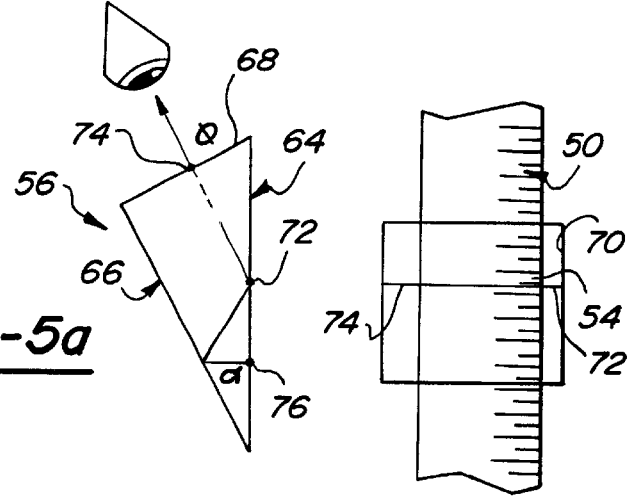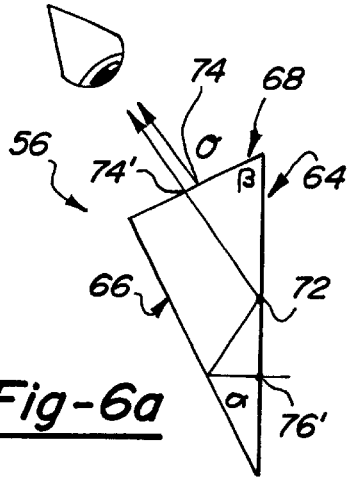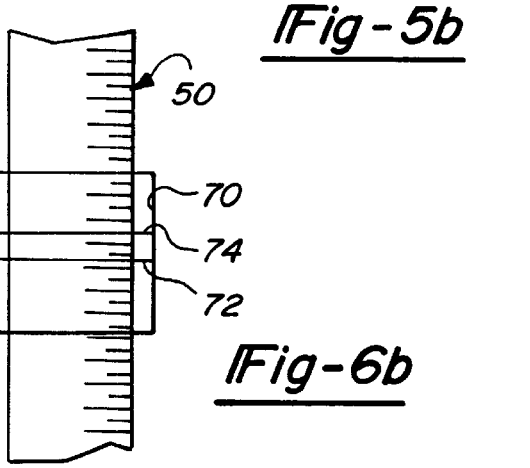

OPTICAL UNIT FOR IMAGE PROJECTION AND TOOL INCORPORATING SAME

This is a continuation of U.S. patent application Ser. No. 09/070,277, filed Apr. 30, 1998, now U.S. Pat. No. 6,141, 147, which is a divisional of U.S. patent application Ser. No. 08/693,730, filed Aug. 7, 1996, now U.S. Pat. No. 5,795,113.

BACKGROUND OF THE INVENTION

1. Field of the Invention

The present invention generally relates to an optical unit for projecting an image. More particularly, but not exclusively, the present Invention relates to a tool which includes an optical unit for projecting an image of a scale which permits the tool user to complete adjustments of the tool from a more ergonomically advantageous position without the introduction of visual parallax error.

2. Discussion

Various tools are used in woodworking and metal forming to efficiently and accurately shape workpieces to desired dimensions and surface qualities. Such tools often include a workpiece forming element such as a bit, cutting blade, or the like, which is adjustable relative to the workpiece. For example, the workpiece forming element, in many instances, is carried by a movable component which is adjustable relative to the workpiece or relative to a base plate or platen upon which the workpiece may be supported. The significant majority of workpiece forming applications require quick and accurate adjustment of the workpiece forming element relative to the workpiece in order to obtain desired results.

A wood planing machine is one example of such a tool in which a workpiece forming element is adjustable relative to a workpiece. A conventional planing machine is used for the surface planing of boards and typically includes one or more rotatably mounted cutting blades attached to a vertically movable carriage assembly. In a typical wood surface planer, a selectively adjustable workpiece opening is defined between the carriage assembly and a workplace support surface. The cutting blades are carried by the carriage assembly so as to be exposed adjacent to the workpiece opening. Generally, the carriage assembly is movably mounted to a plurality of support columns for movement with respect to the workpiece support surface, thereby permitting adjustment of the vertical dimension of the workpiece opening for selectively determining the amount of material to be removed from the workpiece and resultantly the ultimate thickness of the workpiece.

Multiple passes of the workpiece through the workpiece opening are often necessary to obtain the desired thickness and surface quality. Through adjustment of the carriage assembly relative to the support surface, the amount of material removed during a single pass can be varied. A pointer is typically fixed for movement with the carriage assembly and cooperates with a scale carried by the frame for visually indicating the desired thickness of the workpiece. As with other woodworking and metal forming operations, it is highly desirable that a planing machine accomplish workpiece preparation within precise tolerances, high surface quality, and with a significant degree of reproducible results.

While many commercially successful tools, including but not limited to known surface planers, are available which include an adjustable workpiece forming element adapted to be advanced relative to a workpiece and a scale and cooperating pointer for identifying the relative location of the workpiece forming element and the workpiece, all are subject to improvement. For example, such known tools require the user to accurately align his or her line of sight horizontally with the pointer in order to avoid the introduction of visual parallax error. This typically requires the user to bend or stoop to a position In which comfort is compromised and operation of the machine is hindered. This motion is particularly taxing on the user where repetitive adjustment is required. As a result, the quality of the forming operation is often adversely affected.

SUMMARY OF THE INVENTION

It is a principal object of the present invention to provide an optical unit for a tool which ergonomically assists the tool user by projecting a scale and cooperating pointing mechanism to a position visible during normal operation of the tool.

One particular object of the present invention to provide an optical unit attached to a first element for projecting a substantially vertical image carried by a second element through an angle to the vertical for purposes of accurately adjusting the first element vertically with respect to the second element.

It is a related object of the present invention to provide an optical unit which substantially eliminates visual parallax error associated with visual misalignment of a scale and cooperating pointing mechanism.

It is another object of the present invention to provide an optical unit for projecting an image at an angle to the vertical without image is not inverted.

A more specific object of the present invention is to provide an optical unit for a tool of the type adapted to carry out planing of the surface of a workpiece which is operative for enabling the user of the tool to quickly, easily and accurately read a scale mounted on a substantially vertical surface of the tool without requiring the user to horizontally align his or her line of sight with the scale.

In one form, the present invention provides an optical unit for projecting an image. The optical unit includes a first side disposed adjacent the image. The first side is transparent. The optical unit further includes a second side and a third side. The second side is disposed at a first angle with respect to the first side and is preferably internally reflective. The third side is disposed at an angle with respect to the first side. A first locating line extends transversely across the third side. A second locating line extends transversely across the first side. The second locating line is positioned on the optical unit relative to the first locating line such that the first and second locating lines appear to be co-linear when viewed from a predetermined angle relative to the first side. When the image is viewed from the predetermined angle, the image enters the first side substantially perpendicular thereto, thereby minimizing visual parallax error.

In another form, the present invention provides an apparatus for performing a forming operation on a workpiece. The apparatus comprises a frame and a translatable component which includes a workpiece forming element The translatable component is mounted within the apparatus for selective bi-directional movement along a path of travel. A workpiece support surface is disposed relative to the translatable component and cooperates with the translatable component to define a selectively adjustable workpiece opening. A scale carried by the frame adjacent to the translatable component includes indicia incrementally representing the position of the translatable component relative to the workpiece. An optical unit is attached to the translatable component which is adapted to project an image of the scale through a first angle.

In a more preferred form, the present invention provides a planing machine for planing a surface of a workpiece. The planing machine includes a frame and a plurality of vertical support columns mounted within the frame. The planing machine further includes a carriage assembly interconnected to the frame. The carriage assembly includes a workpiece forming element and is mounted to the plurality of support columns for selective bi-directional movement along a path of travel. A workpiece support surface is disposed relative to the carriage assembly so as to define a selectively adjustable workpiece opening therebetween. A scale carried by the frame adjacent to the carriage assembly is marked with indicia incrementally representing a desired thickness of the workpiece. An optical unit is attached to the carriage assembly which is adapted to project an image of the scale through a first angle.

BRIEF DESCRIPTION OF THE DRAWINGS

Additional objects and advantages of the present invention will become apparent from a reading of the following detailed description of the preferred embodiment which makes reference to the drawings of which:

FIG. 3 is an enlarged perspective view of the optical unit of FIG. 1;

FIG. 4 is an enlarged side view of a portion of the optical unit of FIG. 3 in the direction of the line 4—4;

FIG. 5A is a schematic illustration of the optical unit of the present invention shown relative to a viewer positioned at a proper viewing angle;

FIG. 5B is a simplified illustration of the image of the scale as seen by the viewer in FIG. 5A;

FIG. 6A is a schematic illustration of the optical unit of the present invention shown relative to a viewer positioned at an improper viewing angle; and FIG. 6B is a simplified illustration of the image of the scale as seen by the viewer in FIG. 6A.

DETAILED DESCRIPTION OF THE PREFERRED EMBODIMENT

As required, a detailed embodiment of the present invention is disclosed herein. However, it is to be understood that the disclosed embodiment is merely exemplary of the present invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

The present invention is broadly applicable to various tools and particularly applicable to workpiece forming tools of the type including an adjustable component which carries a workpiece forming element. Prior to addressing the specific details of the present invention, a brief understanding of an exemplary tool incorporating the teachings of the present invention is warranted.

Figure 1:
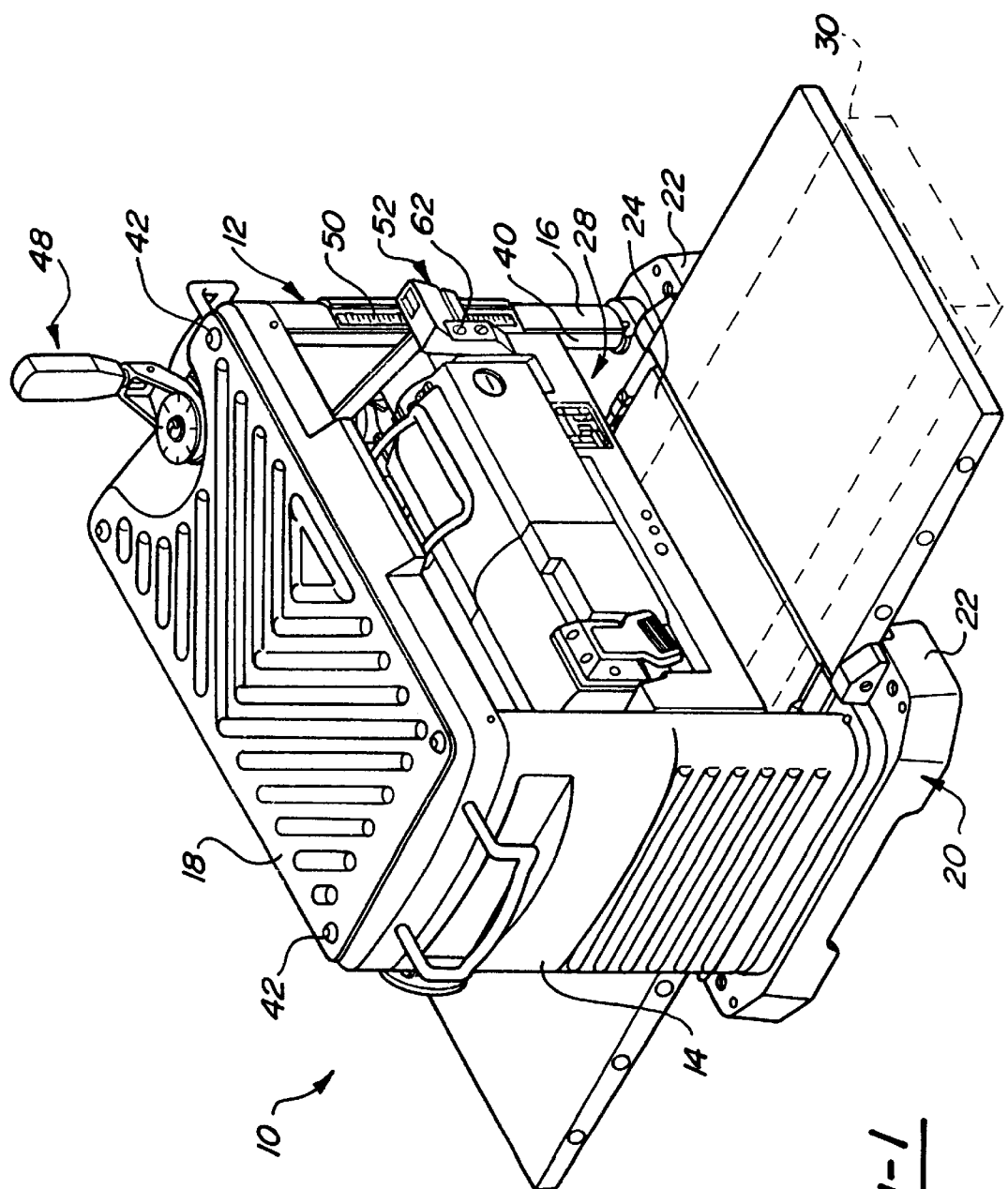
FIG. 1 is a perspective view of a portable surface planing machine constructed to incorporate an optical unit in accordance with a preferred embodiment of the present invention.
Figure 2:
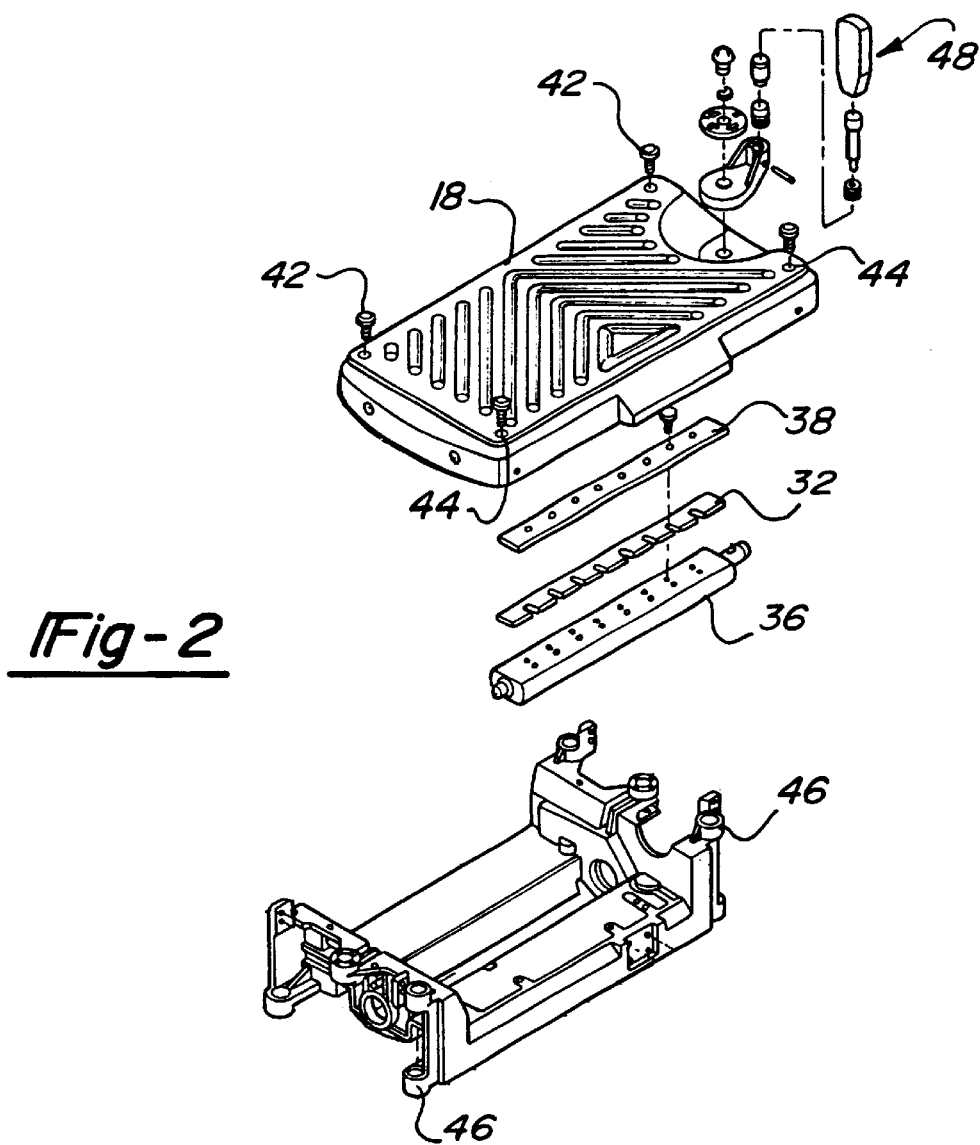
FIG. 2 is an exploded perspective view of various elements of the planing machine associated with an upper portion thereof.

With reference to the drawings in which identical or equivalent elements have been denoted with like reference numerals and specifically to FIGS. 1 and 2 thereof, an exemplary tool is illustrated as a portable surface planing machine adapted for planing the surface of a workpiece. The planing machine is generally identified in the drawings at reference numeral 10. In addition to the following detailed description, a further description of various features of the illustrated surface planing machine 10 not directly related to the present invention is provided in co-pending application Ser. No. 08/659,684. filed on Jun. 5, 1996, which is hereby incorporated by reference as if fully set forth herein.

The planing machine 10 is shown to generally include a frame 12 having a pair of opposing sides 14 and 16, a top 18 and a base 20. The base includes a pair of support feet 22 and a workpiece support surface or platen 24. The planing machine 10 is also shown to include a carriage assembly 26 having an integrally formed casting. The carriage assembly 26 and the platen 24 cooperate to define a workpiece opening 28 for receiving a workpiece 30. In one application, the workpiece opening 28 of the planing machine 10 is sized to accommodate a workplace having a nominal width of twelve and one-half inches or less, however, the present invention should not be considered to be limited thereto. In FIG. 1, the workpiece 30 is shown in broken lines partially extending within the workpiece opening 28.

As shown in the exploded view of FIG. 2, a workpiece forming element in the form of a cutting blade 32 is attached to a cutter head 36. The cutter head 36 is carried by the carriage assembly 26 such that the blade 32 is exposed adjacent an underside of the carriage assembly 26 which is adjacent the workpiece opening 28. Rotational attachment of the cutter head 36 to the carriage assembly 26 is accomplished in a substantially conventional manner. The blade 32 is removably secured to the cutter head 36 by a retention plate 38 and is driven by a motor (not shown) located within the carriage assembly 26.

The carriage assembly 26 is shown to be slidably mounted to a plurality of support columns or support posts for bi-directional vertical movement. One of the support columns is identified in FIG. 1 with reference numeral 40. While not illustrated in detail, each of the plurality of support columns 40 is generally cylindrical and includes a lower end which engages a circular recesses formed in the base 20 of the frame 12. The support columns 40 also include upper ends which engage similar recesses (not shown) formed in the underside of the top 18. Threaded fasteners 42 pass through apertures 44 in the top 18 and base 20 and engage tapped holes (not shown) in the upper and lower ends of the support columns 40. In the embodiment illustrated, four support columns 40 support the carriage assembly 26. The carriage assembly 26 may selectively be translated upward or downward along a path of travel and is guided by integrally formed apertures 46 located in the four comers casting of the carriage assembly 26. Such translation is controlled by rotation of a handle assembly 48 which is interconnected to a threaded drive rod (not shown).

As shown in the perspective view of FIG. 1, a scale 50 is attached to a forward portion of the side 16 of the frame 12. The scale 50 is marked with indicia representing the desired thickness of the workpiece 30. In a conventional manner, a pointer would be carried by the carriage assembly 26 for indicating the relative position of the carriage assembly 26 with respect to the scale 50. With the appropriate indicia, the pointer and the scale 50 conventionally cooperate to identify the desired thickness of the workpiece 30 according to the vertical dimension of the workpiece opening 28. With such a conventional arrangement, however, the user of the machine 10 must horizontally align his or her line of sight with the pointer to avoid the introduction of visual parallax error. Such horizontal alignment is generally not desired, since the machine 10 is typically supported on a table or other surface such that bending or stooping would be required. As will be discussed below, the present invention is intended to overcome this inconvenience which may adversely effect the quality of machine operation.

With continued reference to FIGS. 1 and 2, additional reference to FIGS. 3 through 6, and with the foregoing description of the exemplary tool 10 as background, the specific teachings of the present invention will now be described. As illustrated, the surface planing machine 10 includes an optical unit 52 for projecting an image 54. In the application illustrated throughout the drawings, the image 54 to be projected by the optical unit 52 includes a variable portion of the scale 50.

The optical unit 52 includes a prism portion 56 and a mounting portion 58. In the preferred embodiment, the optical unit 52 is unitarily constructed of plastic. One suitable plastic is acrylic. Alternatively, those skilled in the art will appreciated that the optical unit 52 can be constructed of glass or other suitable material capable of accurately reflecting the image 54. Furthermore, it will be understood that the mounting portion 58 can alternatively be formed independently from the prism portion 56.

As most clearly shown in FIG. 3, the mounting portion of the optical unit 52 is formed to include a pair of apertures 60 passing therethrough. The apertures 60 are adapted to receive threaded fasteners 62 (shown in FIG. 1) which, in turn, engage threaded apertures (not shown) formed in the carriage assembly 26. The optical unit 52 can alternatively be adhesively or otherwise attached to the carriage assembly 26 for movement therewith.

In the preferred embodiment, the prism portion 56 of the optical unit 52 is defined by a first side 64, a second side 66, and a third side 68. The first side 64 is oriented substantially vertically and is disposed adjacent to the scale 50. The second side 66 is disposed at a first angle α with respect to the first side 64. The third side 68 is disposed at a second angle β relative to the first side 64. The first side 64 of the prism portion 56 of the optical unit 52 is transparent while the second side 66 is internally reflective. The third side 68 includes a transparent window 70 through which the image 54 is visible. As will become more apparent below, proper viewing of the image 54 in the prism portion 56 requires the user to align his or her line of sight at a predetermined angle φ with respect to the third side 68 to ensure accuracy of reading (i.e. to avoid the introduction of visual parallax error).

In the particular embodiment illustrated throughout the drawings, the first, second and third sides 64, 66, and 68 cooperate in end view (e.g. as shown in FIG. 5A) to define a triangle. In one application, the triangle is a right triangle and the first angle α between the first side 64 and second side 66 is 30° and the second angle β between the first side 64 and third side 68 is 60°In this particular application, the first side 64 is approximately 26 mm, the second side 66 is approximately 22.5 mm and the third side 68 is approximately 13.2 mm.

The optical unit 52 additionally includes a pointer mechanism, or first locating line 72 for identifying a precise point on the portion of the scale 50 included in the reflected image 54. In the side views of FIGS. 4, 5A and 6A, the first locating line is shown as a point 72. The first locating line 72 is positioned to extend transversely across the first side 64. In the particular application discussed above, the first locating line 72 is spaced approximately 11 mm from the intersection of the first side 64 and the third side 68.

In the preferred embodiment, the optical unit 52 further includes a hairline, or second locating line 74. As will become apparent below, the second locating line 74 cooperates with the first locating line 72 to substantially eliminate visual parallax error when viewing the scale 50 through the prism portion 56. In the application discussed above, the second locating line 74 is positioned approximately 5.5 mm from the intersection of the first side 64 and the third side 68.

FIG. 5A schematically illustrates a simplified view of the image 54 passing through the prism portion 56 of the optical unit 52 when the user's eye is aligned with the third side 68 at an angle Θ of approximately 90°. In this particular position, the first locating line 72 appears co-linear with the second locating line 74. The particular portion of the scale 50 which is aligned with the colinear first and second locating lines 72 and 74 enters the prism portion 56 along a horizontal line 76 at an angle substantially normal to the first side 64. The light rays continue horizontally through the prism portion 56 of the optical unit 52 until they contact the reflective second side 66. At this point, the light rays are reflected upwardly at an angle to the horizontal of approximately 60° until they contact the first side 64. This line of contact is coincident with the first locating line 72. Then, the light rays are reflected at an angle of approximately 30° within the vertical such that they pass through the aligned first and second locating lines 72 and 74. Since the light rays of the image 54 enter the first side 64 and exit the third side 68 substantially parallel thereto, diffraction of the light rays is minimal. Significantly, the image seen by the user is not inverted.

With reference to FIG. 5B, the image 54 seen by the user when viewed from the angle e with respect to the third side 68 is illustrated. Because the light rays enter the prism portion 56 of the optical unit 52 at an angle substantially normal to the first side 64, the introduction of visual parallax error is substantially avoided. It will now be appreciated that the image 54 visible with the window 70 of the prism portion 56 varies as the carriage assembly 26 is vertically translated relative to the remainder of the planing machine 10.

Turning now to FIGS. 6A and 68 the benefit of the first and second locating lines 72 and 74 will be apparent through discussion of the operation of the optical unit 52 when viewed from an improper angle. As shown in the simplified a schematic view of FIG. 6A, the line of sight is oriented at an angle a from the third side 68. The angle σ is slightly greater than 90°. As shown in FIG. 6B, in this incorrect position, the user sees both the first locating line 72 and the second locating line 74. Here, the light rays of the image 54 enter the first side 64 and exit the third side 68 at an angle that is not equal to 90°. In this example, the light rays enter the first side 64 along a line 76' displaced from the line 76 and exit the third side 68 along a line 74' spaced from the second locating line 74. For simplicity of illustration, the light rays in FIG. 6A are not shown being diffracted as they pass through the first side 64 and the third side 68. However, those skilled in the art will recognize that an appreciable amount of diffraction will occur since the angles of entry and exit are not normal to the respective sides 64 and 68. As a result, visual parallax error is introduced and the precision with which the carriage assembly 26 is adjusted may be comprised. However, the user will readily recognize the potential for error since the first and second locating lines 72 and 74 do not appear colinear.

With specific reference to FIGS. 3 and 4, the optical unit 52 is shown to further Include a third locating line 78. The third locating line 78 is preferably in the form of a notch or groove which is horizontally located in the exterior of the second side 66. The third locating line 78 is horizontally aligned with the line 76. In certain applications, the user may desire to read the scale 50 without looking through the prism portion 56. In this regard, the third locating line 78 allows the user to read the scale 50 in a convention manner along a horizontal line of sight.

While the above description constitutes the preferred embodiment of the invention. It will be appreciated that the invention is susceptible to modification, variation, and change without departing from the proper scope or fair meaning of the present invention. In this regard, while the various features of the present invention have been shown and described in connection with a portable surface planing machine, it will be appreciated by those skilled in that art that the disclosed optical unit may be incorporated into other tools and other image applications where projection is desired and many of these features are suitable in connection with other power tools.

We claim:

1. An apparatus for performing a forming operation on a work piece, the apparatus comprising:
   a frame;
   a translatable component movably mounted within the apparatus;
   a work piece opening partially defined by the translatable component;
   a scale carried by the frame adjacent to the translatable component, the scale being marked with indicia incrementally representing the position of the translatable component relative to the work piece; and
   an optical unit attached to the translatable component, the optical unit adapted to project an image of at least a portion of the scale, the optical unit including an optical element having at least a first side, a second side, and a third side, the optical unit further including a first locating line positioned relative to the first side and a second locating line positioned relative to the third side, the first and second locating lines appearing co-linear with respect to each other when the image is viewed at a predetermined angle through the third side.

2. The apparatus for performing a forming operation on a work piece of claim 1, wherein the first and third sides of the optical element are transparent and the second side of the optical element is internally reflective, the first locating line extending transversely across the first side and the second locating line extending transversely across the third side, and wherein an intersection between the first side and the third side is at a first angle and an intersection between the first side and the second side is at a second angle.

3. The apparatus for performing a forming operation on a work piece of claim 2, wherein the second angle is complementary to the first angle.

4. The apparatus for performing a forming operation on a work piece of claim 3, wherein the first angle is approximately 60° and the second angle is approximately 30°.

5. The apparatus for performing a forming operation on a work piece of claim 2, further comprising a third locating line disposed relative to the second side, the third locating line being visible through the second side of the optical element.

6. The apparatus for performing a forming operation on a work piece of claim 1, wherein the optical element is a unitarily constructed prism.

7. A planing machine for planing a surface of a work piece, the planing machine comprising:
   a frame;
   a plurality of vertical support columns mounted within the frame;
   a carriage assembly mounted to the plurality of support columns for selective bi-directional movement along a path of travel;
   a work piece opening partially defined by the carriage assembly;
   a scale carried by the frame adjacent to the carriage assembly, the scale being marked with indicia incrementally representing a desired thickness of the work piece; and
   an optical unit attached to the carriage assembly, the optical unit adapted to project an image of at least a portion of the scale, the optical unit including an optical element having at least a first side, a second side, and a third side, the optical unit further including a first locating line positioned relative to the first side and a second locating line positioned relative to the third side, the first and second locating lines appearing co-linear with respect to each other when the image is viewed at a predetermined angle through the third side.

8. The planing machine for planing a surface of a work piece of claim 7, wherein the carriage assembly includes a work piece forming element.

9. The planing machine for planing a surface of a work piece of claim 7, wherein the optical element is a unitarily constructed triangular prism.

10. The planing machine for planing a surface of a work piece of claim 7, further comprising a third locating line disposed relative to the second side, the third locating line being visible through the second side of the optical element.

11. The apparatus for performing a forming operation on a work piece of claim 7, wherein the first and third sides of the optical element are transparent and the second side of the optical element is internally reflective, the first locating line extending transversely across the first side and the second locating line extending transversely across the third side, and wherein an intersection between the first side and the third side is at a first angle and an intersection between the first side and the second side is at a second angle.

12. The planing machine for planing a surface of a work piece of claim 11, wherein the second angle is complementary to the first angle.

13. The planing machine for planing a surface of a work piece of claim 12, wherein the first angle is approximately 60° and the second angle is approximately 30°.

14. An apparatus having a cutting element for performing a cutting operation on a work piece, the apparatus comprising:
   a frame;
   a carriage assembly connected to the frame;
   a scale positioned on the frame adjacent to the carriage assembly, the scale including indicia incrementally representing the position of the cutting element relative to the work piece; and
   an optical unit attached to the carriage assembly, the optical unit including a prism having a first side, a second side, and a third side, the scale being visible by viewing through the third side of the prism, the optical unit further including a first locating line positioned relative to the first side of the prism and a second locating line positioned relative to the third side of the prism, the first and second locating lines appearing colinear with respect to each other relative to the scale when an image is viewed at a predetermined angle through the third side.

15. The apparatus according to claim 14, wherein the first locating line extends transversely relative to the first side and the second locating line is formed on and extends transversely across the third side.

16. The apparatus according to claim 14, wherein an intersection angle between the first side and the second side is approximately 60° and an intersection angle between the second side and the third side is approximately 30°.

17. The apparatus according to claim 14, wherein the optical unit includes a third locating line positioned relative to the second side and being substantially parallel with the second locating line.

18. The apparatus according to claim 17, wherein the optical unit further includes a groove formed in an outer housing of the optical unit adjacent the second side and being aligned with the third locating line so that the scale can be read along a line of sight including the groove and the third locating line.

19. The apparatus according to claim 14, wherein the optical unit includes an outer housing connected to the carriage assembly, the optical unit being positioned within the housing, the housing including a window relative to the first side of the prism to view the scale therethrough.

* * * * *